Figure 1:
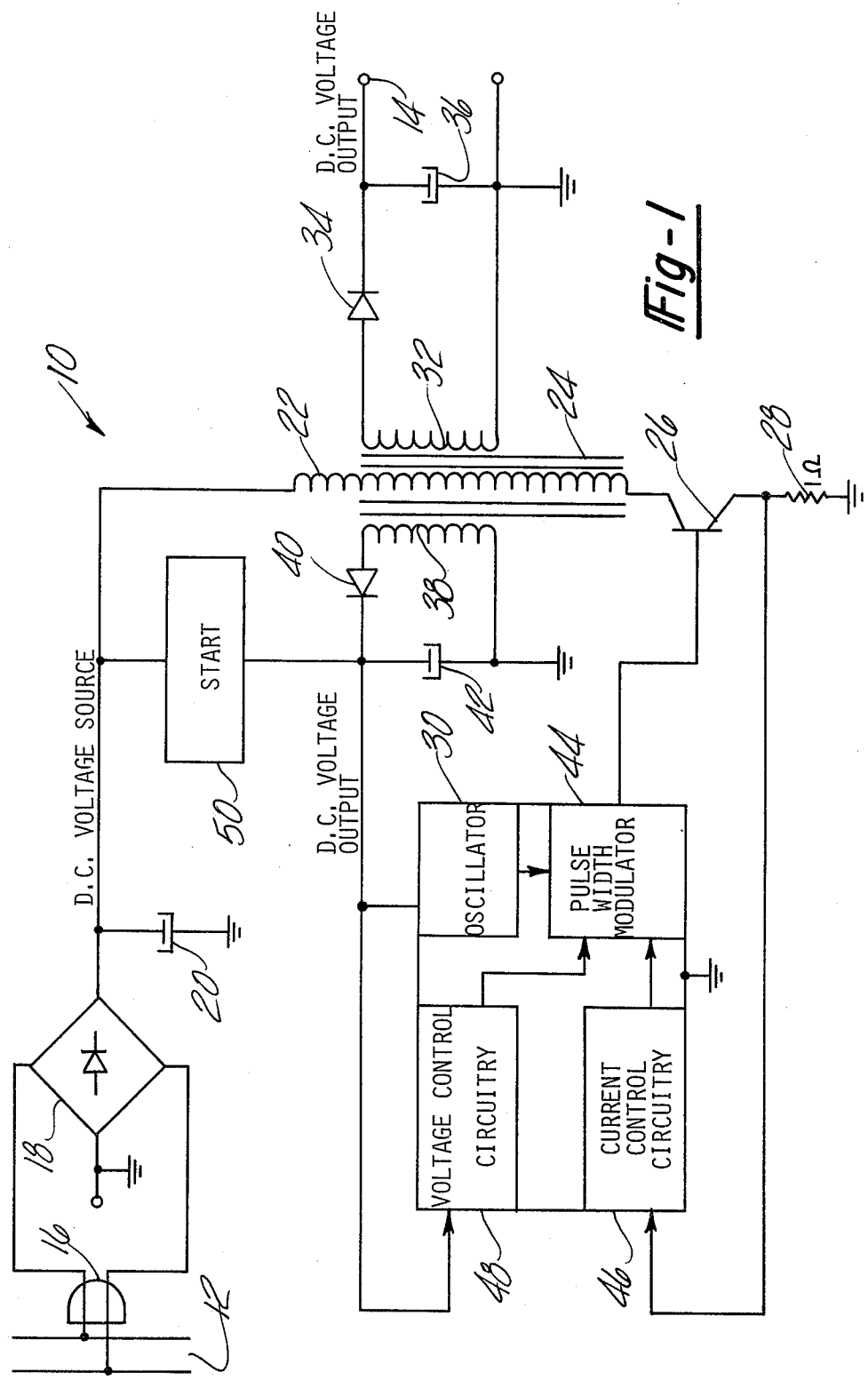

United States Patent [19]

Purol

[11] 4,246,634
[45] Jan. 20, 1981

[54] START-UP CIRCUIT FOR SWITCH MODE POWER SUPPLY

[75] Inventor: Mark F. Purol, Pinckney, Mich.

[73] Assignee: Ann Arbor Terminals, Inc., Ann Arbor, Mich.

[21] Appl. No.: 17,988

[22] Filed: Mar. 7, 1979

[51] Int. Cl.³ .......................................... H02M 3/335
[52] U.S. Cl. ....................................... 363/49; 363/19; 323/901
[58] Field of Search ..................... 363/18–21, 363/49; 323/17, DIG. 1, 22 T

[56] References Cited

U.S. PATENT DOCUMENTS

| | | | |
|---|---|---|---|
| 3,771,040 | 11/1973 | Fletcher et al. | 363/21 |
| 3,866,107 | 2/1975 | Shaw | 363/49 |
| 4,030,024 | 6/1977 | Chambers et al. | 323/DIG. 1 |
| 4,047,089 | 9/1977 | Suzuki et al. | 363/49 |

Primary Examiner—J. D. Miller
Assistant Examiner—Peter S. Wong
Attorney, Agent, or Firm—Krass & Young

[57] ABSTRACT

A switch mode power supply for electronic circuits includes a rectifier for providing direct current from an alternating current line, a transformer connected to the rectifier, and an oscillating switching circuit connected in series with the transformer and the direct current source, operative to chop the direct current source to power the transformer. Power for starting up the oscillator, which requires a substantially lower voltage than that of the rectified source, is derived from a capacitor charged by the direct current source. A comparator senses the voltage on the capacitor and a reference voltage, and controls a transistor switch to discharge the capacitor into the switching circuit, when the proper voltage is attained, initiating the oscillator. A running switch mode power supply connected to a secondary of the transformer then provides power to the oscillator and turns off the transistor switch.

8 Claims, 2 Drawing Figures

START-UP CIRCUIT FOR SWITCH MODE POWER SUPPLY

BACKGROUND OF THE INVENTION

1. Field of the Invention

This invention relates to switch mode power supplies and more particularly to a start-up circuit for the pulse width modulated oscillator of such a power supply.

2. Prior Art

The fly-back type, isolated, switch mode power supply is often used to power electronic systems from an alternating current line because of its relatively low cost and ease of controllability. Essentially, such a system includes a rectifier for power derived from the alternating current source, a transformer, and an oscillating bi-stable switching circuit connected in series with the transformer primary and the rectified source. The oscillator chops the rectified source to provide power to the secondary of the transformer which powers the load. The oscillator rate can readily be controlled by feedback from the transformer secondary and load to adjust the voltage and current provided to the load.

The bi-stable oscillator and its control circuit typically require a lower voltage power source than is supplied by the line rectifier. After the oscillator is initiated this lower voltage may be derived from a secondary winding on the transformer but means must be provided for initiating oscillator action before power is available at the transformer secondary.

Previous fly-back type, isolated, switch mode power supplies have used a variety of forms of start-up circuits for the oscillator but each of these circuits has exhibited certain disadvantages in terms of cost or power dissipation. The obvious but most expensive solution provides a separate low voltage power supply, connected to the line, for the oscillator. Another form of prior art start-up circuit employs a Zener regulator or dropping resistor connected across the direct current power source, but this arrangement dissipates substantial power if left on continuously and a circuit for disconnecting the low voltage power supply after the oscillating action is initiated would be relatively expensive due to the nature of a switch for the high voltage of the DC source.

It has alternatively been proposed to provide a capacitor in series with the direct current source and transformer primary but a relatively expensive switching circuit must be provided to discharge the capacitor to allow start-up after a short turn-off of the power supply.

The present invention is therefore directed toward a start-up circuit for the oscillator of a switch mode power supply employing low voltage, low cost components which automatically starts the circuit at any time and is switched off automatically as soon as the oscillating action starts.

SUMMARY OF THE INVENTION

The switch mode power supply of the present invention includes a start-up circuit powered by a capacitor or a like power storage device connected to the rectified direct current source in parallel with the transformer primary. When the power supply is initiated this capacitor is charged until it attains a voltage required to start up the oscillator. The charge on the capacitor is then dissipated into the oscillator and the oscillating action produces power in a secondary winding of the transformer which then continuously powers the oscillator circuit and turns off the start-up circuit.

The start-up circuit incorporates a voltage divider connected to the direct current source which provides a reduced reference voltage. A transistor circuit connected to the reference voltage and the capacitor voltage acts as a comparator and switches into conduction when the capacitor voltage reaches the reference voltage during start-up of the system. This first transistor circuit controls a switching transistor which connects the capacitor to the oscillator circuit, initiating oscillator action. As soon as voltage in the secondary winding which provides continuous power for the oscillator attains its design voltage the switching circuit that connects the capacitor to the oscillator circuit is turned off. When power is removed from the system the charge on the capacitor is at or below the reference voltage and the system is ready for another immediate start-up.

Figure 2:
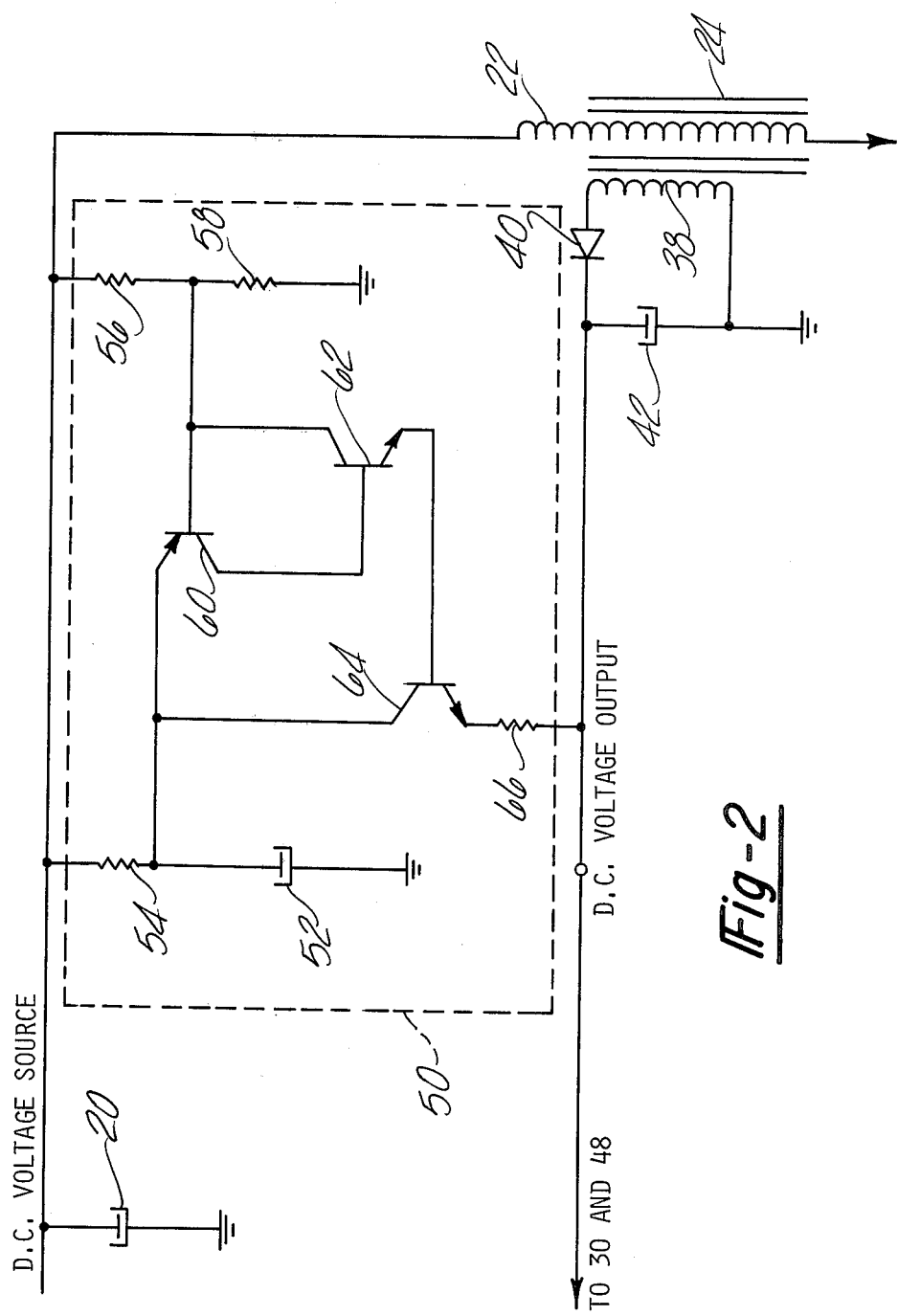

This start-up system uses only a few lost cost components and obviates disadvantages of all previous start-up systems. Other objectives, advantages and applications of my invention will be made apparent by the following detailed description of a preferred embodiment of the invention. The description makes reference to the accompanying drawings in which:

FIG. 1 is a schematic diagram of a fly-back type, isolated, switch-mode power supply employing a start-up circuit formed in accordance with the present invention; and FIG. 2 is a detail of the block diagram of the start-up circuit employed with the system of FIG. 1.

Referring to FIG. 1, a power supply 10 is generally indicated which is operative to receive alternating current electric power from an AC line 12 that may have a nominal voltage of 120 or 240 volts, and to provide output DC power at terminals 14, the output being regulated both as to voltage and current.

At the circuit input a connector 16, pluggable into the AC power line 12, provides power to a conventional fullwave rectifier circuit 18. A capacitor 20 connected across the line at the output of the rectifier 18 acts as a low pass filter to provide a fairly smooth direct current voltage. If the power line 12 has a nominal voltage of 240 volts the voltage across the capacitor 20 may be approximately 340 volts because this is the RMS voltage out of the rectifier 18.

A primary winding 22 of a power transformer generally indicated at 24 is connected in series with the DC output of the rectifier 18. A switching transistor 26 has its emitter-collector circuit connected in series with the primary winding 22 and a low resistance current sensing resistor 28, across the DC line.

The base of the switching transistor 26 is controlled by a pulse width modulator circuit 44 so as to cause the transistor 26 to switch between conduction and nonconduction. The voltage changes which occur in the transformer primary winding 22 during these power switches induce current in a secondary winding 32 of the transformer. The voltage across the secondary winding 32 is provided to a series rectifier 34 and a parallel filter capacitor 36 and the voltage across the capacitor 36 represents the direct current output of the power supply on terminals 14. The secondary winding 32 may be tapped at one or more points to provide different regulated voltages.

Another secondary winding 38, formed on the transformer 24, is connected to a series rectifier 40 and a filter capacitor 42 to provide a power supply for the oscillator 30 and its associated circuits. These include pulse width modulator 44; a current control circuit 46; and a voltage control circuit 48. The current control circuit 46 senses the voltage across resistor 28, which is proportional to the current passing through the transformer primary 22, and controls the pulse width of the modulator 44 to maintain relatively constant primary current and thus constant output current. Similarly, the voltage control circuit 48 senses the voltage provided by the secondary winding 38 and regulates the pulse width of the modulator 44 in order to maintain a constant primary energy and thus a constant voltage at the output terminals 14.

As thus described, the power supply will operate properly once the transistor 26 has switched while voltage is applied to the primary winding 22; however, a separate power supply must be provided for starting oscillator 30 to provide it with power before transistor 26 can switch, since the normal operating power supply for oscillator 30 only becomes operative after the transistor 26 has switched. The present invention provides a start-up power supply 50 connected to the output of the rectifier 18, and providing power to the oscillator 30, in parallel with its normal operating power supply. The start circuit operates to provide initial power to the oscillator 30 to cause it to initiate action of the switching transistor 26 during start-up of the power supply.

The start-up circuit 50 is illustrated in schematic detail in FIG. 2. The circuit includes a capacitor 52 connected in series with a charging resistor 54 across the output of the filter capacitor 20. The capacitor 52 should be large enough to supply the normal energy supplied by secondary winding 38 and have a voltage rating somewhat in excess of the voltage required to start the oscillator 30.

The start-up circuit also includes a voltage divider consisting of a series string of resistors 56 and 58 connected across the filter capacitor 20. The mid-point of this voltage divider is connected to the base of a PNP comparator transistor 60 and acts as a reference voltage. The emitter of transistor 60 is connected to capacitor 52 to sense its voltage.

When the plug 16 is initially connected to the AC line 12 there is no charge on the capacitor 52 and the voltage appearing across the divider 56, 58 prevents the transistor 60 from conducting. The capacitor 52 then begins to charge and when its voltage equals the reference voltage provided by the voltage divider, so that the voltage at the emitter of transistor 60 exceeds the voltage at its base, transistor 60 becomes conductive. The collector of transistor 60 is connected to the base of an NPN transistor 62 with its collector connected to the midpoint of the voltage divider formed by resistors 56 and 58. Accordingly, when the transistor 60 becomes conductive, it switches transistor 62 into conduction which lowers the reference voltage. The emitter of transistor 62 is connected to the base of a discharge transistor 64 having its collector connected to the capacitor 52 and its emitter connected in series with a resistor 66 to provide the voltage output of the start-up circuit to the oscillator 30.

When the transistor 62 becomes conductive it raises the voltage at the base of the transistor 64 causing it to conduct and to provide the voltage across the capacitor 52 to the oscillator circuit. This voltage causes the switching transistor 26 to change into a conductive state, inducing currents in the secondary windings of the transformer 24. The resultant current flowing in the secondary winding 38 provides a continuing source of power to the oscillator 30. It also raises the voltage at the emitter of transistor 64, switching it out of conduction and turning off the start-up circuit 50.

The use of the transistor pairs 60 and 62 to power the discharge transistor 64 creates some hysteresis so that the transistor 60 does not become non-conductive immediately after it becomes conductive, but stays conductive for a sufficient interval to cause complete discharge of capacitor 52.

Once the system has started up and the transistor 64 is non-conductive, the transistor 60 limits the voltage rise of the capacitor 52 to the reference voltage provided by the voltage divider. When the power supply is disconnected from the line 12 the voltage on the capacitor 52 begins to drop below the reference voltage and after a short while its charge will be totally dissipated. However, upon resumption of power to the system its voltage will immediately begin to rise and the system will start up as soon as it reaches the reference voltage.

The start-up system is thus extremely simple, allows repeated start-up of the power supply and automatically switches itself off.

The embodiments of the invention in which an exclusive property or privilege is claimed are defined as follows:

1. In a power supply for electric circuitry, including a source of direct current power, a transformer, a bi-stable oscillating switching circuit connected in series with a direct current power supply and the primary of the transformer; and means for powering the bi-stable switching circuit with power derived from the transformer after initiation of the oscillating action, the improvement comprising: a circuit for initiating operation of the oscillating action of the switching circuit including electric power storage means connected to the direct current supply so as to accumulate a store of power at a voltage which increases in time after initiation of the direct current power source; a source of a reference voltage having a value which is a function of the nominal voltage required to power the switching circuit; and switching means connected to the power storage means and to the reference voltage source and operative to provide the power stored in the storage means to the switching circuit at such time as the stored voltage equals the reference voltage, to thereby initiate oscillation of the switching circuit to thereby provide power to the switching circuit from the secondary winding of the transformer, said switching means comprising a first, second and third transistor, said first transistor being operably coupled between said reference voltage source and said power storage means and activatable when the voltage of said power storage means equals the value of the voltage of said reference voltage source, said third transistor having the collector-emitter circuit thereof operably coupled with said first transistor and defining the output of said initiating circuit, said second transistor being operably coupled with said first and second transistors and with said reference voltage source.

2. The power supply of claim 1 wherein said means for powering the bi-stable oscillating switching circuit from a secondary winding of the transformer is connected to the switching means to reverse the state of the switching means after the initiation of oscillating action.

3. The power supply of claim 1 wherein said power storage means comprises a capacitor.

4. The power supply of claim 1 in which the first transistor has its emitter connected to the power storage means and its base connected to the reference voltage source.

5. The power supply of claim 4 wherein said second transistor has its emitter-collector circuit connected to said reference source and has its base connected to said first transistor such that the second transistor is under control of said first transistor.

6. The power supply of claim 5 wherein said third transistor has its base connected to the emitter of the second transistor so that the first transistor becomes conductive at such time as the second transistor is conductive.

7. The power supply of claim 6 including a connection from said secondary winding of the transformer to said third transistor, operative to drive said third transistor into non-conduction at such time as the power is generated in the secondary of the transformer.

8. In a power supply for electric circuitry, including a source of direct current power, a transformer, a bi-stable oscillating switching circuit connected in series with a direct current power supply and the primary of the transformer; and means for powering the bi-stable switching circuit with power derived from the transformer after initiation of the oscillating action, the improvement comprising: a circuit for initiating operation of the oscillating action of the switching circuit including electric power storage means connected to the direct current supply so as to accumulate a store of power at a voltage which increases in time after initiation of the direct current power source; a source of a reference voltage having a value which is a function of a nominal voltage required to power the switching circuit; and switching means connected to the power storage means and to the reference voltage source and operative to provide the power stored in the storage means to the switching circuit at such time as the stored voltage equals the reference voltage, to thereby initiate oscillation of the switching circuit to thereby provide power to the switching circuit from the secondary winding of the transformer, said switching means including a first, second and third transistor, said first transistor being connected to the power storage means and to the reference voltage source whereby said first transistor becomes conductive when the voltage across the power storage means equals the reference voltage, said first transistor having its emitter connected to the power storage means and its base connected to the reference voltage source, said second transistor having its emitter-collector circuit connected to said reference voltage source and its base connected to said first transistor such that the second transistor is under control of said first transistor, said third transistor having its base connected to the emitter of the second transistor so that the first transistor becomes conductive at such time as the second transistor is conductive.

* * * * *